March 17, 1931.  A. BOITEL  1,796,556
ELECTRIC MOTOR
Filed Oct. 11, 1928   2 Sheets-Sheet 1

INVENTOR:
Achille Boitel
BY: Runge, Boyce & Bakewell
ATTORNEYS

March 17, 1931. A. BOITEL 1,796,556
ELECTRIC MOTOR
Filed Oct. 11, 1928 2 Sheets-Sheet 2

INVENTOR
ACHILLE BOITEL

ATTORNEYS

Patented Mar. 17, 1931

1,796,556

UNITED STATES PATENT OFFICE

ACHILLE BOITEL, OF BERLIN, GERMANY, ASSIGNOR, BY MESNE ASSIGNMENTS, TO DUAL MOTORS, LTD., OF LONDON, ENGLAND

ELECTRIC MOTOR

Application filed October 11, 1928, Serial No. 311,737, and in Germany May 1, 1928.

This invention relates to electric motors, and more specifically to fractional horse-power motors such as are for example employed for driving talking machines and similar purposes.

According to this invention a motor of extremely simple, inexpensive and reliable construction and having a low revolving mass is attained by constructing the armature of a non-magnetic material and in the form of a cylindrical casing open at one end and containing the field magnets in its interior, while it carries the armature winding on its outer or inner circumference, for instance in the shape of flat coils which are preferably constructed without the use of iron in order to avoid induction noises, so that the motor is absolutely noiseless.

The invention has the advantage, that the motor has extremely low revolving masses and thus may be thrown directly on the supply without the starting current attaining an impermissible height if a starting resistance is not employed. Owing to this construction of the armature as a drum armature the motor has an extraordinary strong starting torque and high capacity combined with smallest space requirement.

In the accompanying drawing which illustrates diagrammatically one embodiment of the invention by way of example, Fig. 1 is a longitudinal section through the improved electric motor in which the armature is cut through along the line F—G of Fig. 2;

Figure 1:
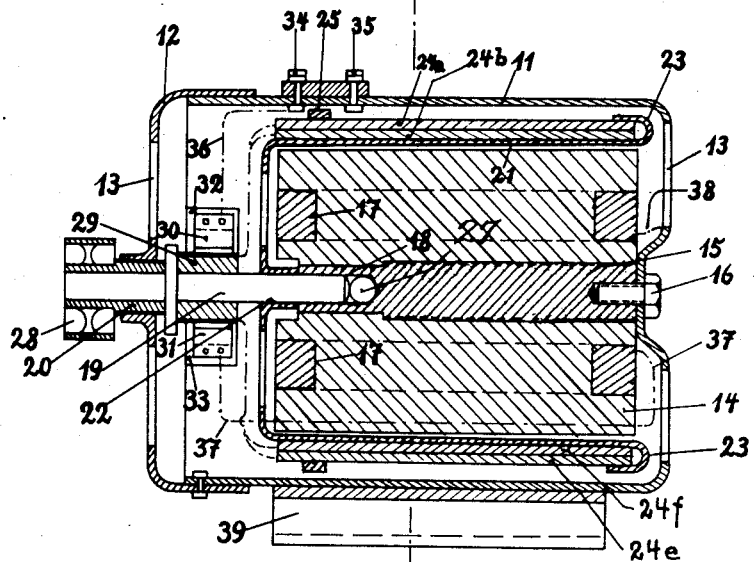

In the example of construction illustrated in Figs. 5 and 6, the motor is in the form of a cylindrical casing 11 which is closed at one end by a removable cover 12. The casing 11 as well as the cover 12 are provided with ventilation openings 13, which permit circulation of air through the interior of the motor. The core 14 of the field magnet, which carries the field coils 17, is mounted on an axially disposed spindle 15 of non-magnetic material, such as copper, and is secured within the casing 11 by means of a screw 16.

In the free end of the spindle 15 there is provided a boring 18 in which one end of the armature shaft 19 is rotatably mounted. The inner end of the said shaft bears against a ball 27, disposed between said shaft and the end wall of the boring 18. The other end of the said shaft is supported in a bearing 20, provided in the cover 12.

The armature consists of a cylindrical casing 21 open at one end fixed upon the shaft 19 at 22 and is constructed of a suitable non-magnetic material, such as drawn bent copper- or brass-plate, which may be slotted in a suitable manner for avoiding eddy-currents.

Figure 2:
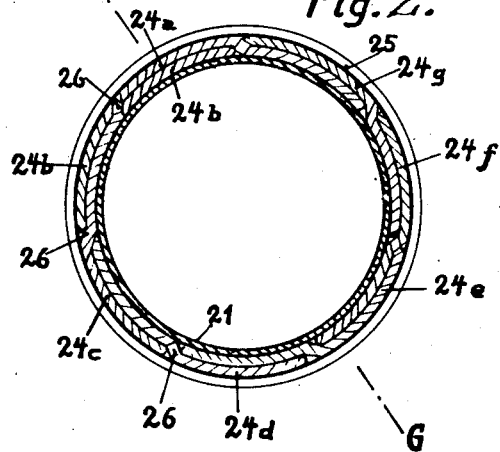
Fig. 2 is a cross-section through the armature along line C—D of Fig. 1.

The open end of the armature casing 21 is turned over to form a pocket as shown at 23 in such a manner that one edge of the armature coils $24^a$, $24^b$, $24^c$, $24^d$, $24^e$, $24^f$ and $24^g$ may be pushed under the turned over edge. The other ends of the amature coils $24^a$, $24^b$, $24^c$, $24^d$, $24^e$, $24^f$ and $24^g$ are preferably secured in position on the casing 21 by means of shrunk-on hoop or band 25. The coils may be bent as indicated at 26 (Fig. 2) in such a manner that they overlap one another. In this way one-half of each coil is situated above and the other half below the adjacent coils.

Besides a belt-pulley 28 there is provided upon the shaft 19 a commutator 29, the brushes 30 and 31 of which are mounted in the casing 11 upon plates 32, 33, formed of insulating material. 34, 35 are the terminals.

In the example shown in the drawings the motor is connected as a direct-current series motor. Accordingly the terminal 34 is connected by a cable 36 with the brush 30.

From there the current passes through the armature coils, and thence through the brush 31 and a cable 37 to the field magnet coils 17 and from thence through a cable 38 to the casing 11 which is connected with the terminal 35.

The casing 11 is provided with a base 39.

Figure 3:
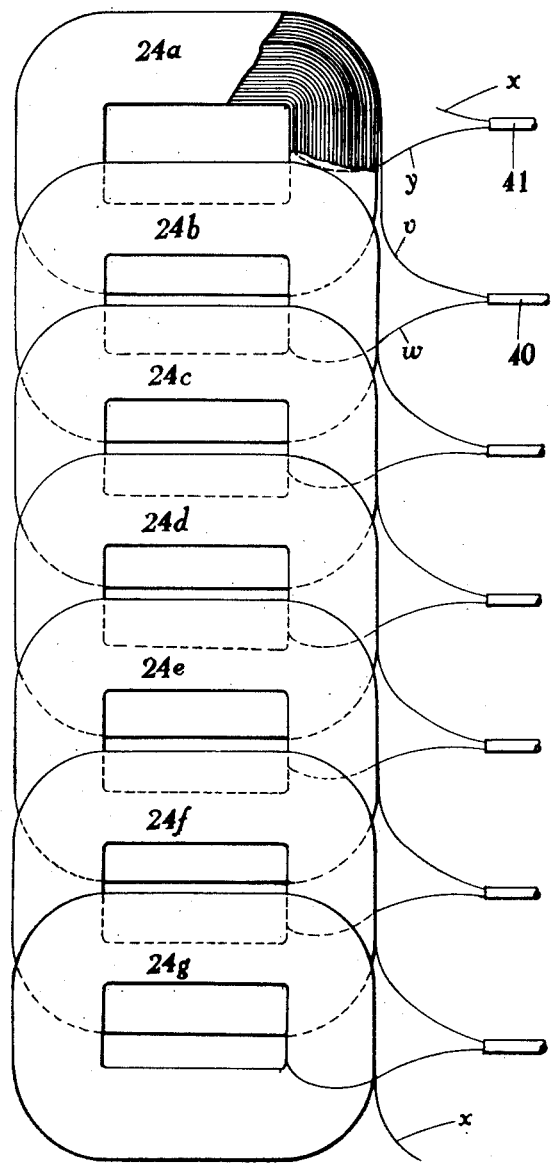
Fig. 3 is a developed diagram of the coils carried by the armature.

The connection of the different coils may be effected in any suitable manner, but as shown in Fig. 3, the outer end $v$ of say the coil 24ᵃ is connected to the inner end $w$ of the adjacent coil 24ᵇ as shown at 40, and so on, the outer end $x$ of the coil 24ᵍ being connected to the inner end $y$ of the coil 24ᵃ as shown at 41. The several terminal connections 40, 41 are connected to the commutator 29 in known manner.

The armature coils may be mounted on the outer or inner surface of the casing 21, or partly outside and partly inside.

Various modifications and changes may be made without departing from the spirit and the scope of the invention, and I desire, therefore, that only such limitations shall be placed thereon as are imposed by the prior art.

I claim as my invention:

1. In an electric motor, an armature formed as a cylindrical casing open at one end, a plurality of flat coils disposed on said casing, means to receive and retain one edge of each of said coils formed around the open end of said casing, means for securing the coils at the other end of the casing and non-rotating field magnets disposed within said casing.

2. In an electric motor, an armature formed as a cylindrical casing open at one end, a plurality of flat coils disposed on the outer surface of said casing, means to receive and retain one edge of each of said coils formed around the outside of the open end of said casing, a circumferential securing band disposed around the coils at the other end of the casing and non-rotating field magnets disposed within said casing.

3. In an electric motor, an armature formed as a cylindrical casing open at one end of non-magnetic material, a plurality of flat iron-core-less coils disposed on said casing, means to receive and retain one edge of each of said coils formed around the open end of said casing, means for securing the coils at the other end of the casing, non-rotating field magnets disposed within said casing and means for collecting the current from said coils.

4. In an electric motor, an armature formed as a cylindrical casing open at one end of non-magnetic material, a rotating shaft supporting said armature, a plurality of flat coils disposed on the outer periphery of said casing, a pocket to receive and retain one edge of each of said coils formed around the outside of the open end of said casing, a circumferential securing band disposed around the coils of the other end of the casing, non-rotating field magnets disposed within said casing, a commutator secured to the rotating shaft to which the ends of the coils are connected and means for collecting the current from said commutator.

In testimony whereof I have hereunto affixed my signature.

ACHILLE BOITEL.